Figure 1:
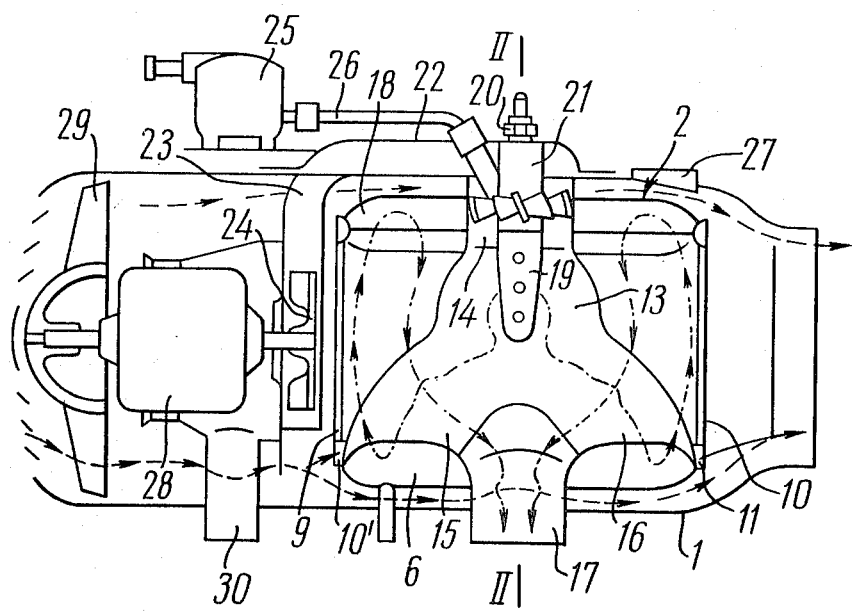

United States Patent

[11] 3,582,052

[72] Inventors Boris Dmitrievich Maltsev
Ulitsa Kominterna, 152;
Boris Nikolaevich Pyatko, Prospekt B.
Khmeinitskago 35, LV.; **Grigory
Mikhailovich Veselov,** Ulitsa Selyanskoya,
22; Felitsian Felitsianovich Aparovich,
Ulitsa Belyaeva, 73, all of Melitopol,
U.S.S.R.
[21] Appl. No. 819,197
[22] Filed Apr. 25, 1969
[45] Patented June 1, 1971

[54] APPARATUS FOR HEATING GAS MEDIUM
5 Claims, 2 Drawing Figs.
[52] U.S. Cl. ................................................. 263/20
[51] Int. Cl. .................................................. F23l 15/04
[50] Field of Search ........................................ 263/20, 19
C

[56] References Cited
UNITED STATES PATENTS
| | | | |
|---|---|---|---|
| 2,405,919 | 8/1946 | Whittle.......................... | 263/19C |
| 2,969,967 | 1/1961 | Buhrer et al. ................. | 263/20 |
| 3,025,407 | 3/1962 | Robson ......................... | 263/19C |

*Primary Examiner*—John J. Camby
*Attorney*—Waters, Roditi, Schwartz & Nissen

ABSTRACT: An apparatus for heating a gas medium, preferably for automobiles and the like, wherein exhaust gases of a combustion chamber are used as the heat-carrying agent, the apparatus being much more compact than those found in the prior art, without a decrease of thermotechnical characteristics, due to the interconnection of the combustion chamber and heat exchanger.

PATENTED JUN 1 1971 3,582,052

APPARATUS FOR HEATING GAS MEDIUM

BACKGROUND OF INVENTION

The present invention relates to apparatus for heating gas media and, more particularly, for heating air supplied to the interior of automobiles, buses and other vehicles.

The present invention can also be used for prestarting the heating of internal combustion engines and other machines under conditions of low ambient temperatures.

There are existing devices utilizing liquid fuel, which incorporate a heat exchanger consisting of three hollow cylinders of different diameters mounted with clearance with one inside the other and forming conduits for the passage of a heat-carrying agent and a air being heated, which air is delivered inside the heat exchanger with the air of a fan.

Exhaust gases of the combustion chamber are used as the heat-carrying agent.

In the prior art devices, the combustion changer is arranged in series-coaxial alignment with the heat exchanger.

With such an arrangement of the combustion chamber the apparatus is of considerable length, since air-eddying devices and the fuel combustion chamber extend considerably beyond one of the ends of the heat exchanger, which fact complicates greatly the installation of the apparatus in automobiles, buses etc.

Shifting the air-eddying devices and the combustion chamber into the internal conduit of the heat exchanger along its axis, which is done in some designs with a view to reducing overall dimensions of the apparatus, brings about a reduction of the active heating surface, as well as shortening the path of gases inside the heat exchanger, which results in impairing the thermotechnical characteristics of the heat exchanger and of the apparatus in general.

It is an object of the present invention to eliminate the above-mentioned disadvantages of prior art devices.

It is a further object of the invention to solve the technical problem of arranging the combustion chamber inside the heat exchanger so that the former should not increase the overall dimensions of the apparatus and, at the same time, should not impair the thermotechnical characteristics of the apparatus.

To accomplish these and other objects in an apparatus for heating gas medium comprising, a heat exchanger consisting of a system of hollow elements, the latter elements being mounted one inside the other with clearance and forming conduits of which the inner and outer elements serve for the passage of the heat-carrying agent and the intermediate conduit—for the passage of the medium being heated, and a liquid fuel combustion chamber disposed in the inner conduit, exhaust gases of the chamber serving as the heat-carrying agent, while the inner and outer conduits are interconnected inside the heat exchanger on one side thereof, the present invention provides an inlet pipe branch of the combustion chamber passing through a port interconnecting the inner and outer conduits, while the outlet portion of the combustion chamber is in communication with the outer conduit in the heat exchanger portion which lies opposite the port, and the inner conduit is provided with a pipe branch for removing the heat-carrying agent, the latter pipe branch being disposed in the heat exchanger portion in which the combustion chamber communicates with the outer conduit and being in between the outlet pipe branches coaxially relative to the inlet pipe branch of the T.

Preferably the combustion chamber is T-shaped, with one inlet and two outlet pipe branches, whereby a uniform distribution of the heat-carrying agent in the conduits throughout the heat exchanger length is ensured. The T is arranged in the plane of the heat exchanger longitudinal axis, the inlet pipe branch of the T passing outside across the heat exchanger longitudinal axis through the port, side faces of the outer hollow element and casing in such a manner that its axis is equidistantly spaced from the butt faces of the heat exchanger, and the outlet pipe branches of the T being equidistantly disposed at both sides of the axis of the inlet pipe branch of the T and communicating with the outer conduit in the heat exchanger portion opposite to the port.

The arrangement of the inlet pipe branch of the combustion chamber and the pipe branch for removing the heat-carrying agent from the inner conduit on the heat exchanger lateral axis provides a more uniform distribution of the heat-carrying agent throughout the length of the heat exchanger.

The present invention including the mutual disposition of the heat exchanger and the T make it possible to decrease the overall dimensions of the heat exchanger along its length as the combustion chamber and its inlet pipe branch do not protrude outside the butt faces of the hollow elements of the heat exchanger. The conduits are symmetrically disposed for the passage of the heat-carrying agent relative to the longitudinal and lateral axes of symmetry of the heat exchanger, which provides for the uniform distribution of the heat-carrying agent in the conduits and uniform heating of the walls of the heat exchanger along its length.

In the apparatus for heating the gas medium, the outlet opening of the fan for forcing air into the fuel combustion chamber is disposed on the casing, and that for the passage of air communicates with the inlet pipe branch of the combustion chamber by an air passage communicating with the casing and overlapping the outlet opening and inlet pipe branch.

Figure 2:
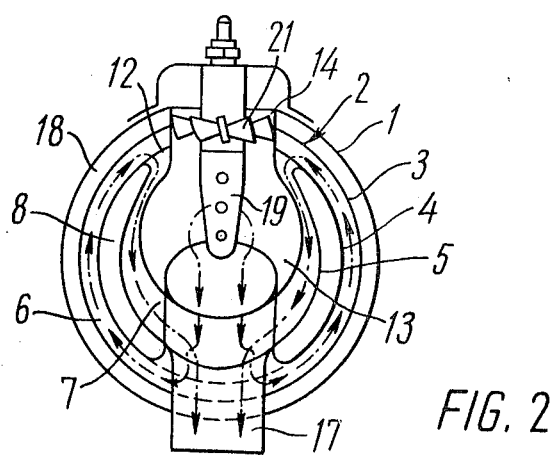

Other objects and advantages of the present invention will appear more completely from the following detailed description of an exemplary embodiment thereof with due reference to the accompanying drawings, wherein:

FIG. 1 shows schematically an apparatus for heating a gas medium, embodying the present invention, in longitudinal section; and FIG. 2 is a sectional view along line II—II of FIG. 1. The apparatus of the present invention comprises a body 1 (FIGS. 1 and 2), simultaneously serving as a casing, inside which there is disposed with a clearance a heat exchanger 2 consisting of a system of hollow elements, i.e. cylinders 3, 4 and 5 (FIG. 2) of different diameters axially aligned and mounted with clearance provided between each cylinder. Conduits formed by the cylinders inside the heat exchanger serve for the passage of the medium being heated and of the heat-carrying agent, the latter passing through the outer 6 and inner 7 conduits, and the gas medium being heated—through the intermediate conduit 8. The heat exchanger is closed at its end faces with lids on covers, one of which, 9 (FIG. 1), has an opening 10′ adapted for allowing the gas medium being heated (this being air in the present case) to enter the heat exchanger, while the opposite lid 11 adapted for the egress of the heated gas.

The outer 6 and inner 7 conduits communicate with each other inside the heat exchanger via port 12 (FIG. 2).

The inner conduit 7 accommodates a liquid fuel combustion chamber 13 made T-shaped.

An upper inlet pipe branch 14 of the combustion chamber 13 passes through an opening in the body 1 the side surface of the cylinder 3 and the port 12 communicating with the conduits 6 and 7.

Outlet pipe branches 15 and 16 are connected with the outer conduit 6 on the heat exchanger side which lies opposite to the port 12.

A pipe branch 17 serves to remove exhaust gases from the inner conduit 7 beyond the heat exchanger and is disposed in the portion of the conduit in which the outlet pipe branches 15 and 16 (FIG. 1) are connected with the outer conduit 6 (FIG. 1). The pipe branch 17 (FIGS. 1 and 2) adapted for removing combustion products (heat-carrying agent) and the inlet pipe branch 14 of the combustion chamber 13 are arranged on the lateral axis of symmetry of the heat exchanger 2.

The space between the body 1 and the outer cylinder 3 can also serve as a conduit 18 adapted for the passage of air being heated.

The pipe branch 14 of the combustion chamber 13 accommodates a perforated burner 19 with a light-up plug 20, and an air-eddying device 21.

The burner and all the elements connected therewith are rigidly secured to a cover 22 forming with the latter a single removable unit.

Such an arrangement makes it possible to facilitate and improve the servicing of the apparatus, since the removal of the cover allows easy access to the combustion chamber and heat exchanger, as well as allowing the cleaning the heat exchanger without disassembling the apparatus by any known method, namely: mechanically, with the aid of compressed air, by using a liquid scale solvent followed by blowing with compressed air, etc.

The cover 22 is made hollow and serves as an air passage connecting the pipe branch 14 of the combustion chamber 13 with the outlet opening of a pipe branch 23, disposed on the body, the pipe branch 23 leading from a fan 24 placed in a scroll. Secured on the cover 22 is a fuel governor 25 with a float chamber connected with the union sleeve of the light-up plug 20 by means of a fuel pipe branch 26. A temperature switch 27 is also mounted on body 1. Disposed in the front portion of the body 1 is an electric motor 28 for driving a fan 29 for feeding air to be heated into the conduits 8 and 18, and the fan 24 for feeding air into the combustion chamber 13.

When the operating switch on the control panel is switched from an "OFF" position to a "START" position, the electric motor 28 and light-up plug 20 are supplied with current from a storage battery.

The fan 24 receives air via an inlet pipe branch 30 and delivers it from the scroll via the air passage of the cover 22 to the combustion chamber 13 and the heat exchanger 2.

As soon as the filament of the actuated light-up plug 20 is heated to a high temperature (indicated by the orange color of the control filament on the control panel), the operating switch is shifted to the "OPERATION" position. When so doing, an electromagnetic valve of the float chamber of the fuel governor 25 is opened, and fuel flows by gravity from said float chamber, via jet tube and fuel pipe branch 26, onto the very hot filament of the light-up plug 20, is mixed with air whirled by the air-eddying device 21, and evaporates in the burner 19 and ignites.

After the burning in the combustion chamber 13 becomes stabilized, the temperature switch 27 operates (a signal lamp on the control panel lights up), and the current supply to the light-up plug 20 is disconnected; further burning is maintained by the flame front in the combustion chamber 13. Combustion products from the combustion chamber first pass via pipe branches 15 and 16 into the outer conduit 6 of the heat exchanger (the path of their travel is shown in FIGS. 1 and 2 by dot-and-dash arrows), then, via port 12, they flow into the inner conduit 7, and leave through the exhaust pipe branch 17.

Air, fed with the aid of the impeller action of the fan 29 passing through the conduits 8 and 18, is heated by the hot walls of the heat exchanger 2 and leaves through the opening in the rear end lid (the path of the air travel is shown in FIGS. 1 and 2 by dashed arrows).

The apparatus is deenergized by shifting the switch from the "OPERATION" position to the "OFF" position, whereupon the fuel supply is cut off and burning terminates.

When the temperature of heated air is lowered to a value preset by adjusting the temperature switch 27, the latter cuts off the supply of the electric motor 28, thus terminating the blowing and cooling of the combustion chamber 13 and the heat exchanger 2.

We claim:

1. A device for heating a gaseous medium, comprising a heat exchanger having a longitudinal and a lateral axis, a plurality of hollow elements mounted in said heat exchanger, said plurality of hollow elements being axially aligned and having clearance between adjacent ones of said elements forming inner, intermediate and outer conduits, a heat-carrying agent being carried in said inner and outer conduits, a port for connecting said inner and outer conduits, said intermediate conduit carrying said gaseous medium being heated, a liquid fuel combustion chamber located within said inner conduit and including an inlet pipe, said inlet pipe communicating with said port, said combustion chamber being provided with an outlet portion, said outlet portion communicating with said outer conduit and being located opposite said port, a pipe, said pipe communicating with said inner conduit for removing said heat-carrying agent.

2. An apparatus as set forth in claim 1, wherein said inlet pipe of the fuel combustion chamber and said pipe for removing the heat-carrying agent from the inner conduit are located on said lateral axis of said heat exchanger.

3. An apparatus as set forth in claim 1, wherein said fuel combustion chamber is T-shaped having one inlet and two outlet pipe branches.

4. An apparatus as set forth in claim 3, wherein said heat exchanger includes butt faces and said casing includes side faces, and is fashioned as a said T being arranged in the plane of said longitudinal axis of said heat exchanger, the inlet branch of said T passing across said longitudinal axis of the heat exchanger through said port, side faces of said casing and said outer hollow element with its axis being equidistantly spaced from said butt faces of said heat exchanger, and the outlet pipe branches of said T are equidistantly arranged at both sides of the axis of said inlet pipe branch.

5. An apparatus as set forth in claim 3, wherein said pipe branch is disposed in between said outlet pipe branches coaxially relative to the inlet pipe branch of T.